US008712000B2

(12) United States Patent
Fawks, Jr.

(10) Patent No.: US 8,712,000 B2
(45) Date of Patent: Apr. 29, 2014

(54) TRANVERSE IN-CORE PROBE MONITORING AND CALIBRATION DEVICE FOR NUCLEAR POWER PLANTS, AND METHOD THEREOF

(75) Inventor: James Edward Fawks, Jr., Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 986 days.

(21) Appl. No.: 12/000,491

(22) Filed: Dec. 13, 2007

(65) Prior Publication Data

US 2009/0154633 A1    Jun. 18, 2009

(51) Int. Cl.
*G21C 17/108* (2006.01)
(52) U.S. Cl.
USPC .......................................... 376/254; 376/255
(58) Field of Classification Search
USPC ................................................ 376/254, 245
See application file for complete search history.

(56) References Cited

U.S. PATENT DOCUMENTS

| 3,751,333 | A | * | 8/1973 | Drummond et al. | 376/255 |
| 3,940,318 | A | * | 2/1976 | Arino et al. | 205/48 |
| 3,998,691 | A | * | 12/1976 | Shikata et al. | 376/169 |
| 4,140,911 | A | * | 2/1979 | Todt et al. | 250/390.01 |
| 4,196,047 | A | * | 4/1980 | Mitchem et al. | 376/202 |
| 4,284,472 | A | * | 8/1981 | Pomares et al. | 376/186 |
| 4,462,956 | A | * | 7/1984 | Boiron et al. | 376/287 |
| 4,475,948 | A | * | 10/1984 | Cawley et al. | 75/230 |
| 4,493,813 | A | * | 1/1985 | Loriot et al. | 376/409 |
| 4,532,102 | A | * | 7/1985 | Cawley | 376/185 |
| 4,597,936 | A | * | 7/1986 | Kaae | 376/411 |
| 4,617,985 | A | * | 10/1986 | Triggs et al. | 165/272 |
| 4,639,349 | A | * | 1/1987 | Baratta et al. | 376/254 |
| 4,663,111 | A | * | 5/1987 | Kim et al. | 376/185 |
| 4,729,903 | A | * | 3/1988 | McGovern et al. | 427/5 |
| 4,782,231 | A | * | 11/1988 | Svoboda et al. | 423/249 |
| 4,818,471 | A | * | 4/1989 | Thomson et al. | 376/254 |
| 4,859,431 | A | * | 8/1989 | Ehrhardt | 250/432 PD |
| 5,053,186 | A | * | 10/1991 | Vanderheyden et al. | 376/189 |
| 5,096,656 | A | * | 3/1992 | Moreau | 376/245 |
| 5,145,636 | A | * | 9/1992 | Vanderhevden et al. | 376/189 |

(Continued)

FOREIGN PATENT DOCUMENTS

JP          60256093 A       12/1985
JP          60256093 A    *  12/1985

OTHER PUBLICATIONS

USPTO Office Action for U.S. Appl. No. 14/036,552 dated Feb. 24, 2014.*

(Continued)

*Primary Examiner* — Jack W Keith
*Assistant Examiner* — Sean P Burke
(74) *Attorney, Agent, or Firm* — Harness, Dickey & Pierce, PLC

(57) ABSTRACT

A method and apparatus for the calibration of neutron flux monitoring devices used in a nuclear reactor core. The apparatus includes a transverse in-core probe (TIP) cable with a neutron absorber located a fixed distance apart from a TIP detector. The neutron absorber may be passed within close proximity of the neutron flux monitoring device such that a perceived drop in measured neutron flux occurs, whereupon the cable may be repositioned relative to the monitoring device to ensure that the TIP detector is within close proximity of the monitoring device for purposes of calibrating the monitoring device.

5 Claims, 4 Drawing Sheets

(56) References Cited

U.S. PATENT DOCUMENTS

| | | | | |
|---|---|---|---|---|
| 5,192,490 | A * | 3/1993 | Burel | 376/154 |
| 5,355,394 | A * | 10/1994 | van Geel et al. | 376/189 |
| 5,377,105 | A * | 12/1994 | Smith | 702/8 |
| 5,400,375 | A * | 3/1995 | Suzuki et al. | 376/435 |
| 5,513,226 | A * | 4/1996 | Baxter et al. | 376/170 |
| 5,596,611 | A | 1/1997 | Ball | |
| 5,615,238 | A * | 3/1997 | Wiencek et al. | 376/202 |
| 5,623,109 | A * | 4/1997 | Uchida et al. | 73/865.9 |
| 5,633,900 | A * | 5/1997 | Hassal | 376/189 |
| 5,682,409 | A * | 10/1997 | Caine | 376/202 |
| 5,758,254 | A * | 5/1998 | Kawamura et al. | 423/2 |
| 5,867,546 | A * | 2/1999 | Hassal | 376/202 |
| 5,871,708 | A * | 2/1999 | Park et al. | 424/1.25 |
| 5,910,971 | A * | 6/1999 | Ponomarev-Stepnoy et al. | 376/189 |
| 6,056,929 | A * | 5/2000 | Hassal | 423/249 |
| 6,160,862 | A * | 12/2000 | Wiencek et al. | 376/202 |
| 6,192,095 | B1 * | 2/2001 | Sekine et al. | 376/189 |
| 6,233,299 | B1 * | 5/2001 | Wakabayashi | 376/202 |
| 6,456,680 | B1 | 9/2002 | Abalin et al. | |
| 6,678,344 | B2 * | 1/2004 | O'Leary et al. | 376/170 |
| 6,751,280 | B2 * | 6/2004 | Mirzadeh et al. | 376/189 |
| 6,804,319 | B1 * | 10/2004 | Mirzadeh et al. | 376/189 |
| 6,895,064 | B2 * | 5/2005 | Ritter | 376/194 |
| 6,896,716 | B1 * | 5/2005 | Jones, Jr. | 75/396 |
| 7,157,061 | B2 * | 1/2007 | Meikrantz et al. | 423/2 |
| 7,235,216 | B2 * | 6/2007 | Kiselev et al. | 422/159 |
| 2002/0034275 | A1 * | 3/2002 | Abalin et al. | 376/189 |
| 2003/0012325 | A1 * | 1/2003 | Kernert et al. | 376/202 |
| 2003/0016775 | A1 * | 1/2003 | Jamriska et al. | 376/195 |
| 2003/0103896 | A1 * | 6/2003 | Smith | 424/1.11 |
| 2003/0179844 | A1 * | 9/2003 | Filippone | 376/208 |
| 2004/0091421 | A1 * | 5/2004 | Aston et al. | 424/1.11 |
| 2004/0105520 | A1 * | 6/2004 | Carter | 376/268 |
| 2004/0196942 | A1 * | 10/2004 | Mirzadeh et al. | 376/189 |
| 2004/0196943 | A1 * | 10/2004 | Di Caprio | 376/190 |
| 2005/0105666 | A1 * | 5/2005 | Mirzadeh et al. | 376/198 |
| 2005/0118098 | A1 * | 6/2005 | Vincent et al. | 424/1.11 |
| 2006/0062342 | A1 * | 3/2006 | Gonzalez Lepera et al. | 376/195 |
| 2006/0126774 | A1 * | 6/2006 | Kim et al. | 376/202 |
| 2007/0133731 | A1 * | 6/2007 | Fawcett et al. | 376/202 |
| 2007/0133734 | A1 * | 6/2007 | Fawcett et al. | 376/438 |
| 2007/0297554 | A1 | 12/2007 | Lavie et al. | |
| 2008/0031811 | A1 * | 2/2008 | Ryu et al. | 424/1.11 |
| 2008/0076957 | A1 * | 3/2008 | Adelman | 600/8 |

OTHER PUBLICATIONS

Japanese Office Action dated Jun. 21, 2013 for corresponding Japanese Application No. 2008-310358 (full translation provided).
Feb. 24, 2014 Office Action issued in related U.S. Appl. No. 14/036,552.

* cited by examiner

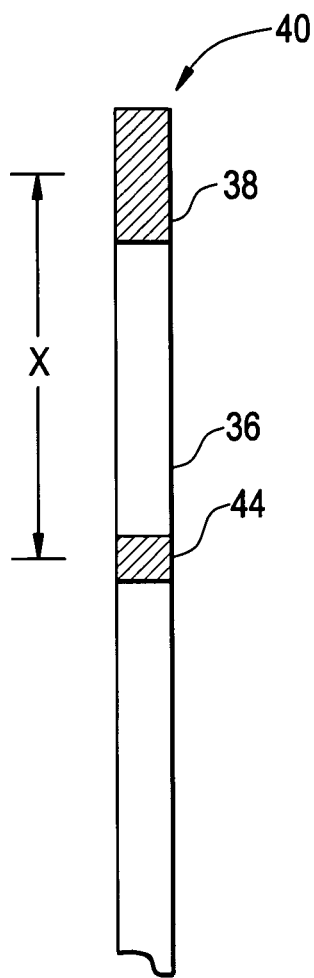
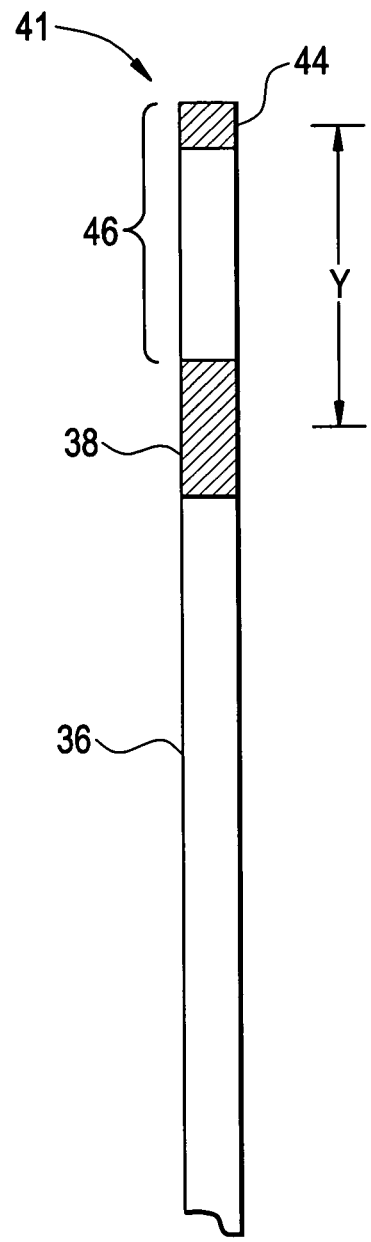

TRANVERSE IN-CORE PROBE MONITORING AND CALIBRATION DEVICE FOR NUCLEAR POWER PLANTS, AND METHOD THEREOF

BACKGROUND OF THE INVENTION

1. Field of the Invention

Example embodiments relate in general to a method and apparatus for the monitoring of power readings and the calibration of neutron flux monitors in a nuclear reactor core, using Transverse In-Core Probes (TIP).

2. Related Art

A typical nuclear power plant includes neutron flux monitors, such as local power range monitors (LPRMs), which monitor neutron flux at many discrete points throughout the reactor. This information may be processed by core monitor software that determines the 3-Dimensional (3D) nodal powers used in monitoring, controlling and modeling reactor power levels. While LPRMs may accurately measure neutron flux, over time these instruments lose sensitivity at different rates, such that the gain electronics of these instruments must be individually recalibrated. A transverse in-core probe (TIP) system may be used in this recalibration process.

Conventionally, a TIP system includes a TIP detector attached to a TIP cable that is mechanically moved in and out of a nuclear reactor core, through dry tubes or other types of instrument tubes. Conventionally, instrument tubes house the LPRMs, and the instrument tubes allow the TIP cable to be drawn through the tube such that the TIP detector may be positioned directly next to the LPRM which is being calibrated. TIPs may take gamma flux readings, and these readings may be recorded at about every axial inch of cable movement, as the cable moves through the instrument tube. Conventionally, TIP detector gamma flux readings are taken at axial elevations throughout the core, and these readings are used to calibrate the LPRMs located at known axial and radial locations throughout the reactor core. This calibration of LPRMs may need to be repeated on a continual basis, every 60 days, or as otherwise determined by a plant maintenance schedule.

However, a concern that the exact location of a TIP detector is not known exists, because as TIP cables become compressed or worn overtime and as the cable is expelled through tortuous and long pathways throughout the reactor core, the exact length of the cable and the subsequent exact location of the TIP detector located on the TIP cable becomes uncertain. A recalibration of the LPRMs based on TIP detector readings that may be out-of-place can create inaccuracies in LPRM readings, which may affect the accurate control and monitoring of power levels in the core.

SUMMARY OF THE INVENTION

Example embodiments are directed to a transverse in-core probe (TIP) monitoring and calibration device, and a method of calibrating a monitoring device in a nuclear reactor core. The monitoring device may be an LPRM monitor, or another monitor that is capable of reading neutron flux. The TIP device includes a cable with a neutron absorber located a fixed distance apart from a TIP detector. The TIP detector is an instrument capable of reading flux, such as gamma or neutron flux. The neutron absorber may be affixed to the cable by an extension that is able to fit onto an existing or conventional TIP cable. The neutron absorber may be made of Boron-10, Cadmium, Hafnium, or any other material that absorbs neutrons and causes an appreciable decrease in the measurement of a neutron flux monitoring device when placed within close proximity of the device.

Methods of calibrating the device include passing the cable through a nuclear reactor core near the monitoring device while continuously recording the TIP detector readings, the monitoring device readings, and the length of cable expelled into the core. The recorded readings are used to determine the TIP detector measurement and monitoring device measurement to be used for calibration purposes. This is accomplished by using a peak dip in the monitoring device measurement as a reference point to determine the location of the neutron absorber (and thereby, the location of the TIP detector a fixed distance from the neutron absorber) relative to the monitoring device. Once the TIP detector measurements and monitoring device measurements have been determined, they may be compared to each other in order to calibrate the monitoring device by well-known methods.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 2 is a transverse in-core probe (TIP) system, according to an example embodiment of the present invention.

FIG. 3 is another transverse in-core probe (TIP) system, according to an example embodiment of the present invention.

DETAILED DESCRIPTION

Figure 1:
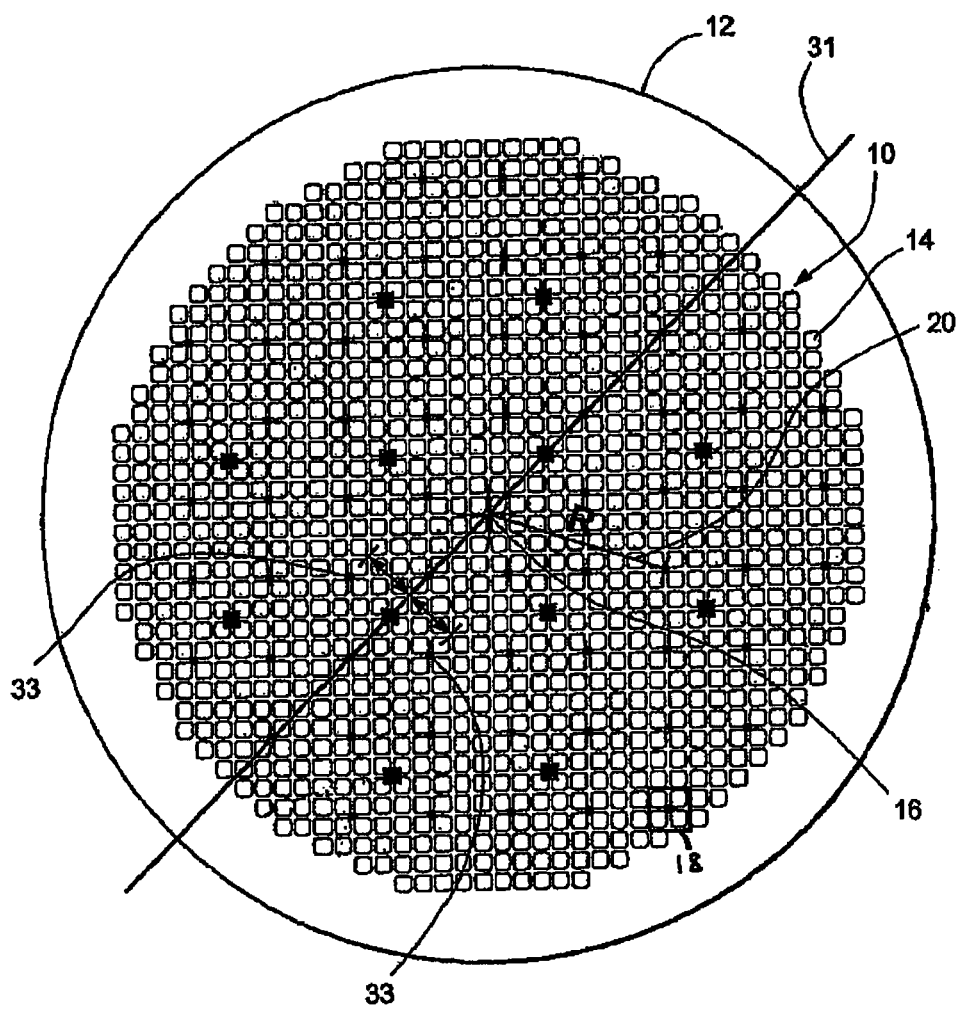
FIG. 1 is an overhead view of a conventional nuclear reactor core.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 illustrates an overhead view of a conventional nuclear reactor core. As shown, a conventional reactor vessel 12 contains a nuclear reactor core 10 comprised of hundreds of fuel bundles 14 forming a matrix array. Many individual Local Power Range Monitors (LPRMs) 33 are generally located in symmetrical fashion along a line of symmetry 31, the LPRMs 33 being capable of taking neutron flux measurements. Conventionally, the LPRMs 33 are located at the cross-junction between four fuel bundles 18, such that the LPRM 33 is surrounded by individual fuel bundles 14. While FIG. 1 depicts an overhead view of LPRM 33 locations at one elevation of the core 10, it should be appreciated that LPRMs 33 may be located throughout the core 10 along other axial positions (i.e., other elevations), such that the LPRMs 33 are collectively monitoring neutron flux at many radial (e.g., distance 20 from the center 16 of the core) and axial (elevation) locations dispersed throughout the core 10.

FIG. 2 illustrates a transverse in-core probe (TIP) system 40 according to an example embodiment of the present invention. As shown, a TIP detector 38 is attached to a TIP cable 36. The TIP detector 38 may be any well-known TIP detector, and the TIP cable 36 may be any well-known TIP cable. Example embodiments further include a neutron absorber 44, that may be made from Boron-10, Cadmium, Hafnium, or any other suitable material that may effectively absorb neutrons in such a manner that a perceived drop in neutron flux measurements may be experienced by LPRMs that come into close proximity with the neutron absorber 44. Example embodiment allows for attachment of the neutron absorber 44 by any number of methods, including weaving the neutron absorber 44 into the cable 36, splicing the cable 36 and inserting the neutron absorber 44, or otherwise attaching and/or embedding the absorber 44 within or on the cable 36. The neutron absorber 44 is to be located a fixed distance (x) apart from the TIP detector 38, as this distance is used to accurately calibrate the LPRM.

FIG. 3 illustrates another TIP system 41 according to another example embodiment of the present invention. As shown, a conventional TIP detector 38 on a conventional cable 36 is outfitted with a cable extension 46. The cable extension 46 includes a neutron absorber 44 that is located a fixed distance (y) from the TIP detector 38. The cable extension 46 may be attached to the cable 36 by clamping, soldering, splicing, weaving, adhesion or any other capable manner of securely attaching the extension 46 to the cable 36.

Figure 4:
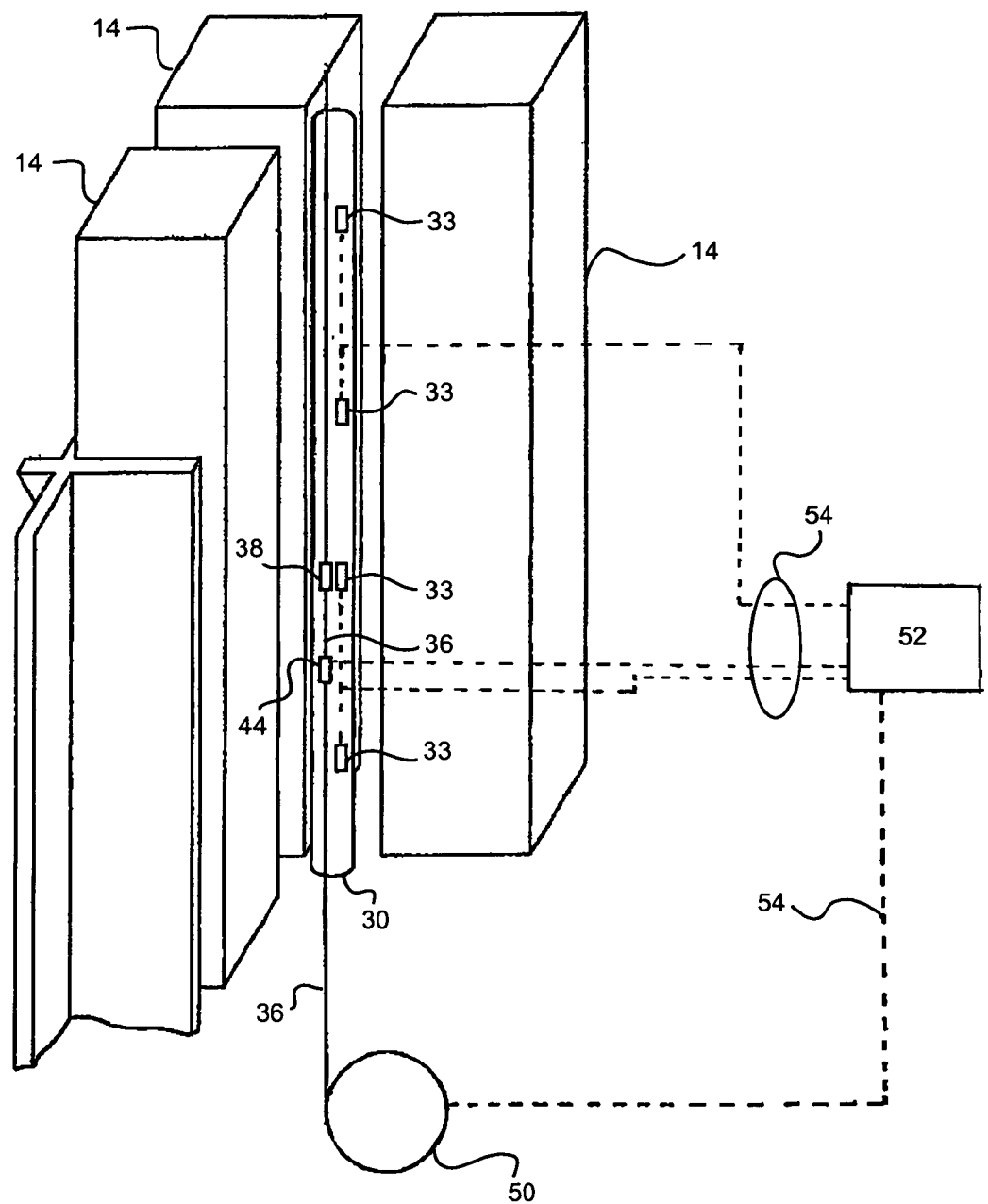
FIG. 4 is an elevation view of an example embodiment of a TIP system in use, inside an instrument tube of a nuclear reactor core.

FIG. 4 illustrates an elevation view of an example embodiment of a TIP system 40/41 in use, inside an instrument tube of a nuclear reactor core. As shown, a conventional instrument tube 30 runs axially through the core 10 and houses a number (in this case, four) of LPRMs 33 along the length of the instrument tube 30. TIP cable 36 is depicted as being drawn through the tube 30. The direction of the cable 36 travels, during the period when LPRM 33 and TIP detector 38 measurements are being taken, does not matter, as the cable 36 may move either down to up (axially increasing, in elevation within the core) or up to down (axially decreasing, in elevation within the core). The cable 36 includes a TIP detector 38 and a neutron absorber 44 affixed to the cable 36. As discussed above, the TIP detector 38 and the neutron absorber 44 are a fixed distance from each other. The TIP cable 36 may be housed on a reel 50 that turns, allowing the cable 36 to enter the core and travel through the instrument tube 30. The cable travel length (the length of cable expended by the reel 50) may be measured and recorded based on the radial rotation of the reel 50. Alternatively, the cable may be drawn through the core, or allowed to be lowered into the core, by any other method that allows the cable travel length to be measured as the cable moves through the core. Signals 54 collectively represent instrument signals from the TIP detector 38, LPRMs 33 and the reel 50 (measuring reel rotation) that may be transmitted to a computer 52 that records the measurements. These signals 54 are exemplary, and they may be transmitted to the computer 52 through wiring, radio or wireless transmission, fiber-optic cable, telemetry or any other manner of transmitting the signals 54 to a computer 52. The computer 52 may be a database, a plant control room, a personal computer (PC), a recording machine, or any other device or devices that may record instrument readings commensurate with the example embodiments.

Figure 5:
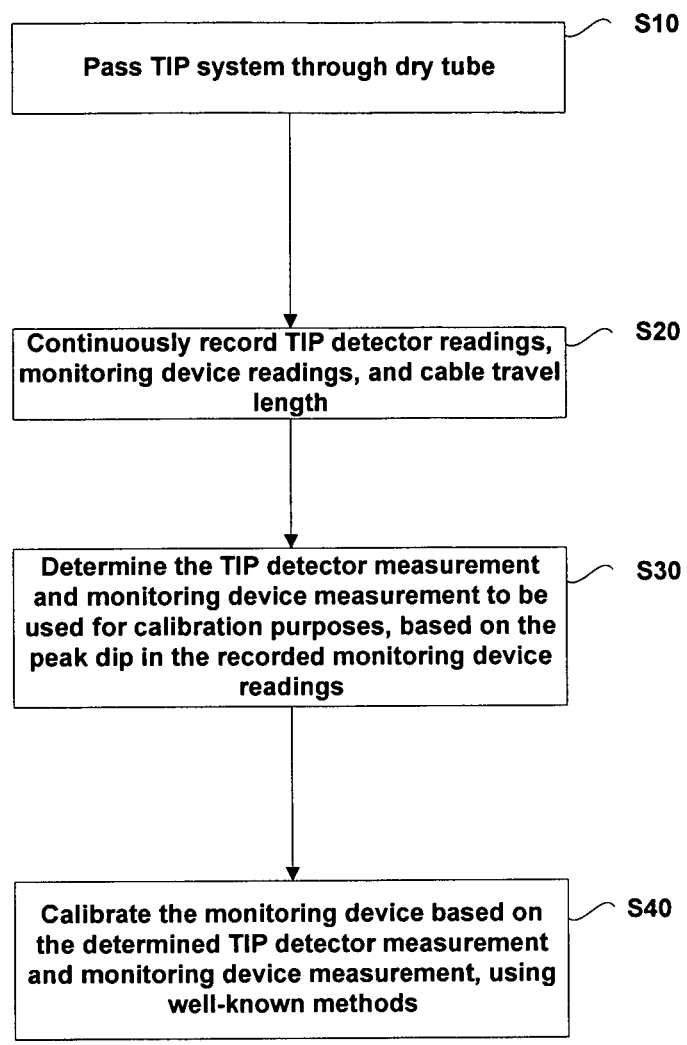
FIG. 5 is a flowchart of a method for calibrating a local power range monitor using a transverse in-probe system according to an example embodiment of the present invention.

FIG. 5 illustrates a method of calibrating a monitoring device such as a local power range monitor (LPRM) using a transverse in-core probe system according to an example embodiment of the present invention. As shown, in step S10 the TIP system 40/41 is passed through the instrument tube of a nuclear reactor. It is suggested that the TIP system is passed through the core at a steady rate, for instance through the use of a motor that may pass the TIP cable through the core at a metered pace. In step S20, measurements are continuously recorded from the TIP detector and monitoring device, while the cable travel length is also recorded. The recorded TIP detector and monitoring device readings may be recorded as a function of cable travel length, or alternatively the TIP/monitoring device readings and the cable travel length measurement may be time-date stamped. While these readings may be recorded on a continuous basis, "continuous" in this context includes recording these measurements on an intermittent basis, which may include recording TIP detector and monitoring device measurements for example at every inch of cable travel, or at another discrete distance of cable travel, or at discrete increments of time. The TIP detector readings, monitoring device readings, and cable travel length may all be recorded on the computer 52, a database, on any known recording device, recorded by hand, or be otherwise documented for later access of measurements commensurate with the calibration of the monitoring device.

In step S30 of FIG. 5, the TIP detector measurement and monitoring device measurement are determined, for calibration purposes. This is accomplished by identifying the peak dip in the monitoring device measurement, and using this as a reference point to determine the cable travel length associated with the point at which the monitoring device and TIP detector were proximally closest to each other. It should be appreciated that as the neutron absorber passes by the monitoring device, the monitoring device experiences a dip, or a perceived decrease in flux readings caused by the presence of the neutron absorber. The appreciable decrease in the monitoring device reading may occur gradually, as a small decrease followed by a more pronounced decrease, as the neutron absorber comes into closer contact with the monitoring device. It is the peak dip, or the most pronounced decrease in the monitoring device flux reading, that signifies the point when the neutron absorber is proximally closest to the monitoring device. By determining the cable travel length associated with the peak dip, and then adding or subtracting the fixed distance (the known distance between the TIP detector and neutron absorber) to the cable travel length (depending on if the neutron absorber is leading or following the TIP detector, respectively), the cable-travel calibration-length may be determined. The cable-travel calibration-length is the length of cable expelled into the core to cause the TIP detector to be proximally closest to the monitoring device. The TIP detector measurement and the monitoring device measurement at the cable-travel calibration-length, are the measurements determined in step S30.

In step S40 of FIG. 5, the determined TIP detector measurement and monitoring device measurements of step S30 are then used to calibrate the monitoring device using well-known methods such as adjusting the electronic gain of the monitoring device. The monitoring device calibration is accomplished in order to bring the monitoring device flux reading within conformity of the TIP detector reading.

While FIG. 5 is an exemplary procedure, it should be appreciated that the calibration may be accomplished by other methods that use the neutron absorber to create a dip in a monitoring device reading, the dip being used as a reference point to determine the location of the TIP detector relative to the monitoring device for calibration purposes. For instance, it is not necessary for the TIP detector and monitoring device readings to be taken continuously, or recorded as a function of cable travel length. FIG. 5 may be altered so that the cable is positioned where the monitoring device measurement experiences a peak dip, and then the cable is repositioned a fixed distance forward or backward (depending on whether the TIP detector is following or leading the neutron absorber through the core, respectively) to ensure that the TIP detector and monitoring device are proximally close to each other. Once the TIP detector and monitoring device are proximally near each other, the TIP detector and monitoring device readings may be taken and used for calibration purposes. Other such scenarios may also allow the monitoring device to be calibrated in real-time, allowing the TIP detector to remain within close proximity of the monitoring device during and following calibration, to ensure that the monitoring device is measuring flux at the same rate as the TIP detector prior to the TIP cable being extracted from the instrument tube.

While a TIP detector is used in example embodiments of the present invention, it should be readily understood by a person of ordinary skill in the art that any detector located a fixed distance from a neutron absorber may be used, wherein the neutron absorber is used to provide a reference point to determine the location of the detector within a nuclear reactor core.

For purposes of these example embodiments, the terms "near", or "close proximity" with respect to the distance between the monitoring device and the neutron absorber and/or TIP detector, may be defined as an inch or less, or it may be defined as several inches or more. The distance between the monitoring device and the neutron absorber (in essence, the distance between the monitoring device and the cable) are constrained only by the ability of the neutron absorber to appreciably affect the monitoring device readings. During the subsequent repositioning of the cable to ensure that the TIP detector is positioned near the monitoring device, this distance between the TIP detector and the monitoring device is constrained only by the accuracy of the calibration itself, as a more accurate calibration will be obtained by a smaller distance between the monitoring device and the TIP detector.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A Transverse In-Core Probe (TIP), comprising:
a cable;
a TIP detector attached to the cable; and
a neutron absorber affixed to the cable, a fixed distance apart from the TIP detector, wherein the neutron absorber comprises Boron-10, Cadmium or Hafnium.

2. The TIP of claim 1, wherein the neutron absorber is woven or embedded within the cable.

3. The TIP of claim 1, wherein the fixed distance apart is about 6 inches.

4. A Transverse In-Core Probe (TIP), comprising:
a cable;
a TIP detector attached to the cable; and
an extension attached to an end of the cable, the extension including a neutron absorber, wherein the neutron absorber comprises Boron-10, Cadmium or Hafnium,
wherein the TIP detector and the neutron absorber are a fixed distance apart from each other.

5. The TIP of claim 4, wherein the fixed distance apart is about 6 inches.

* * * * *